Aug. 17, 1937.　　　H. A. BURT　　　2,090,028
TYPOGRAPHICAL MACHINE
Filed Aug. 29, 1935　　　9 Sheets-Sheet 1

INVENTOR
Harold A. Burt
BY
Morrison Kennedy Campbell ATTORNEYS

Aug. 17, 1937.  H. A. BURT  2,090,028
TYPOGRAPHICAL MACHINE
Filed Aug. 29, 1935  9 Sheets-Sheet 2

INVENTOR
Harold A. Burt
BY
Morrison, Kennedy, Campbell ATTORNEYS

Aug. 17, 1937.  H. A. BURT  2,090,028
TYPOGRAPHICAL MACHINE
Filed Aug. 29, 1935   9 Sheets-Sheet 3
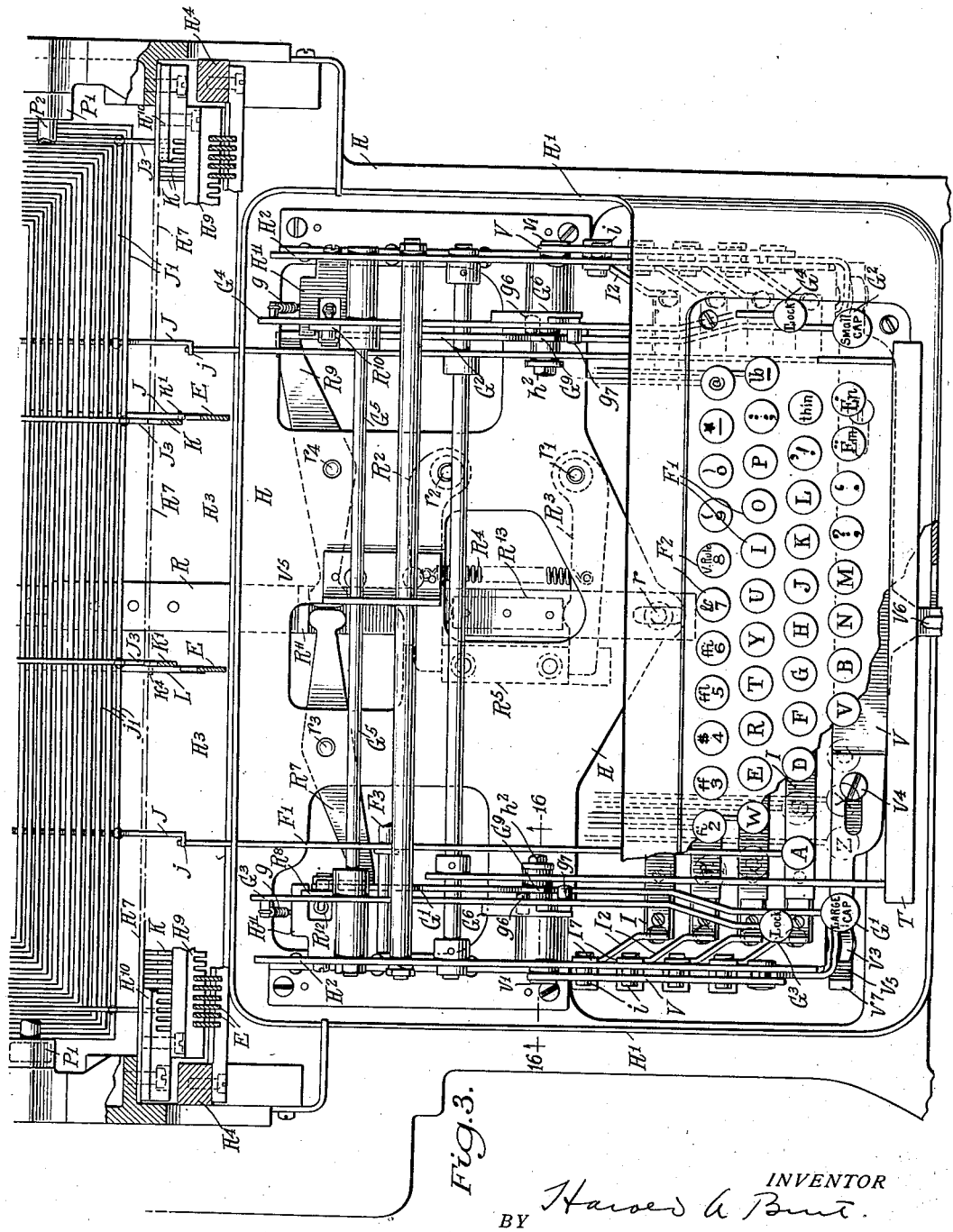

Aug. 17, 1937.  H. A. BURT  2,090,028
TYPOGRAPHICAL MACHINE
Filed Aug. 29, 1935  9 Sheets-Sheet 4
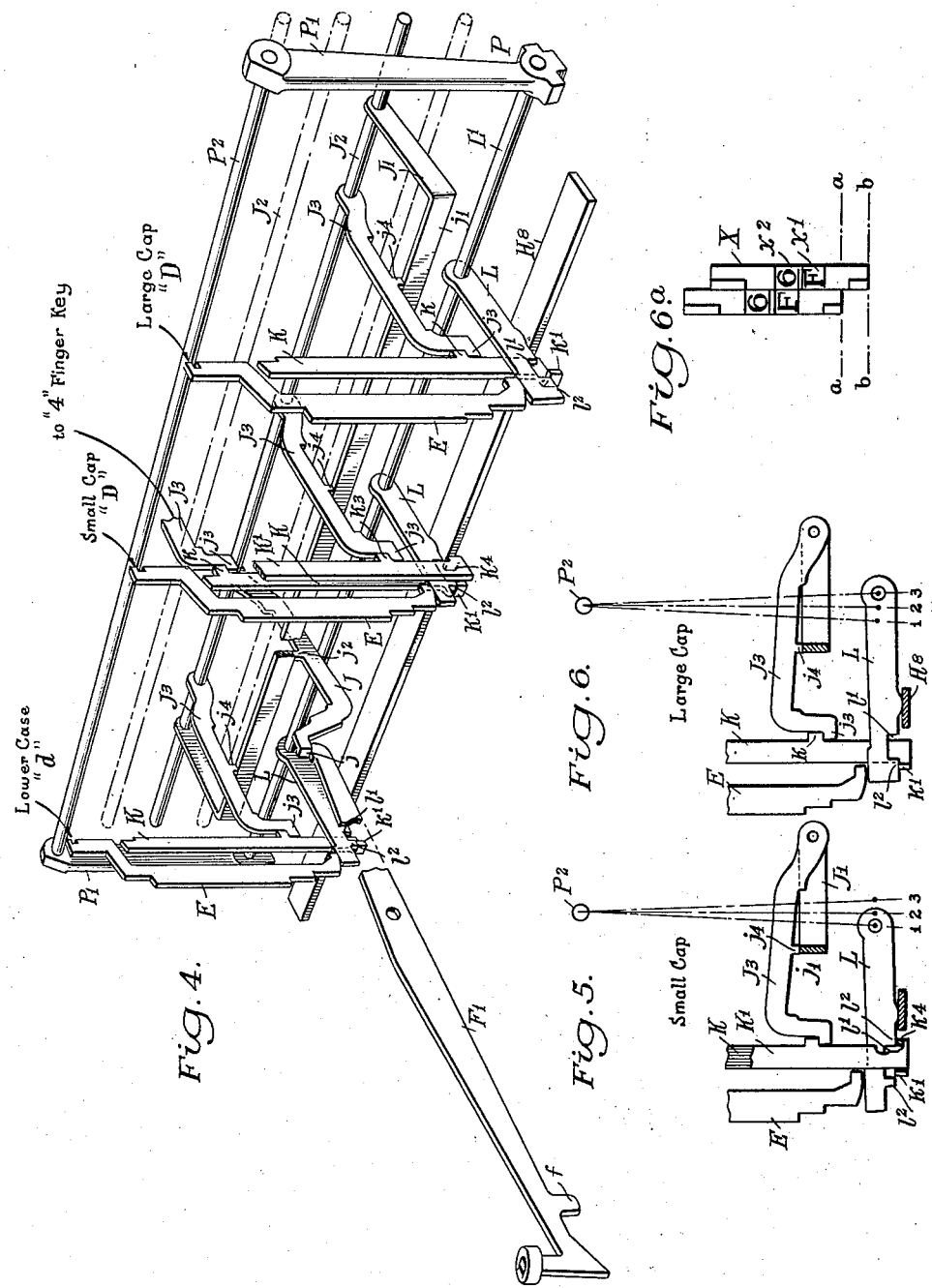
INVENTOR
BY Harold A. Burt
Norman Kennedy Campbell ATTORNEYS

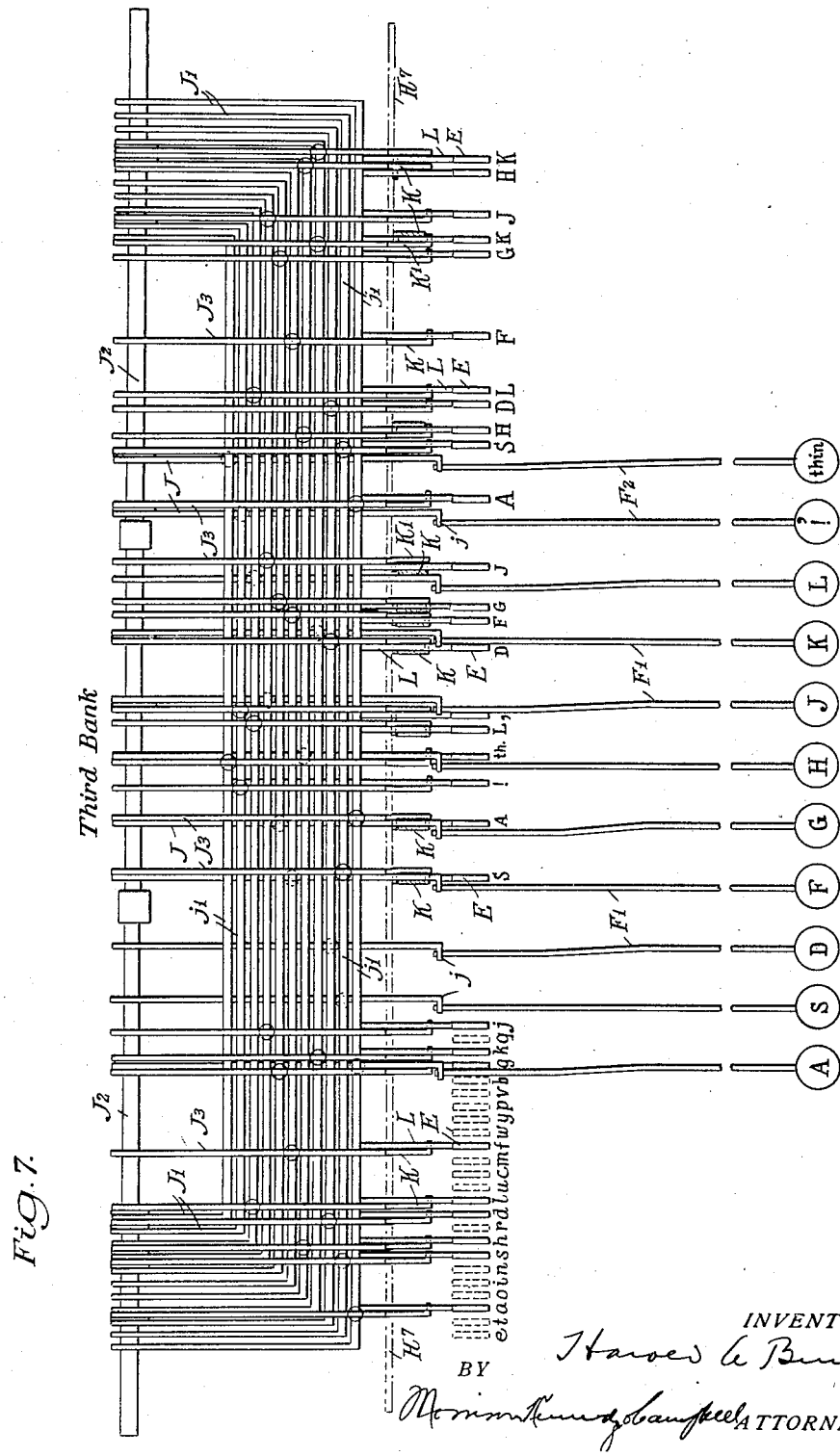

Aug. 17, 1937.                H. A. BURT                   2,090,028
                         TYPOGRAPHICAL MACHINE
                          Filed Aug. 29, 1935           9 Sheets-Sheet 6
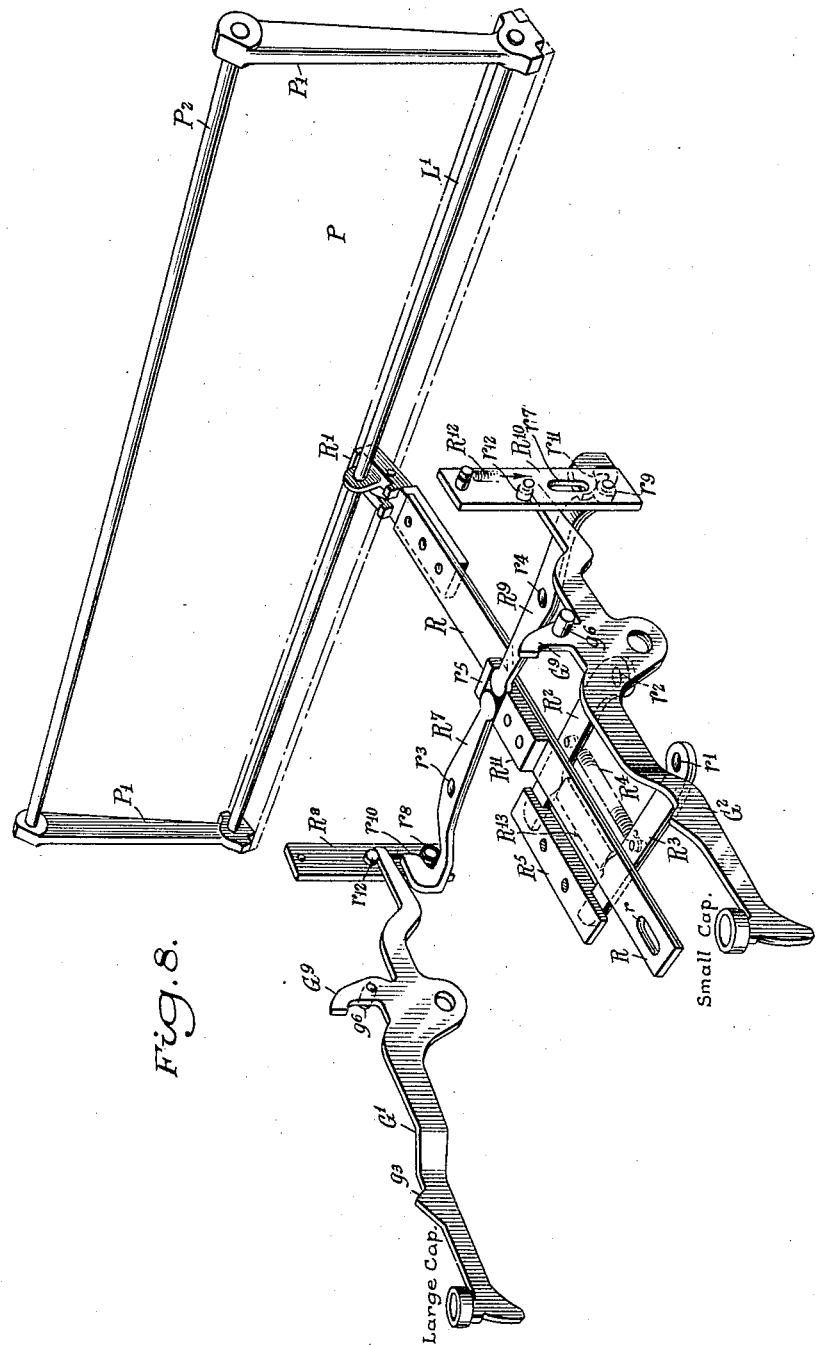

Aug. 17, 1937.  H. A. BURT  2,090,028
TYPOGRAPHICAL MACHINE
Filed Aug. 29, 1935   9 Sheets-Sheet 7
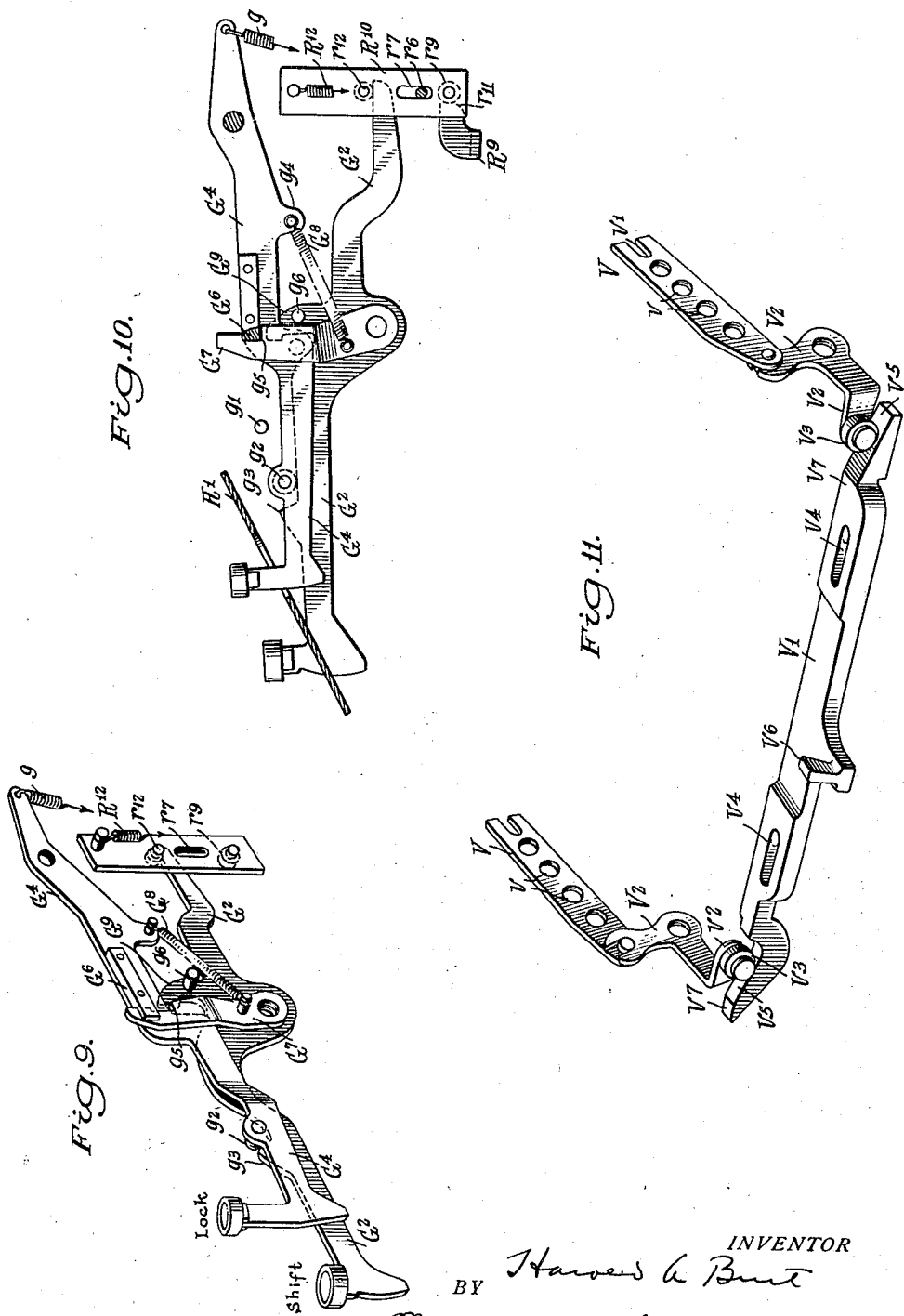
INVENTOR
Harvey A. Burt
BY
Morrison Kennedy Campbell
ATTORNEYS Aug. 17, 1937.   H. A. BURT   2,090,028
TYPOGRAPHICAL MACHINE
Filed Aug. 29, 1935   9 Sheets-Sheet 8
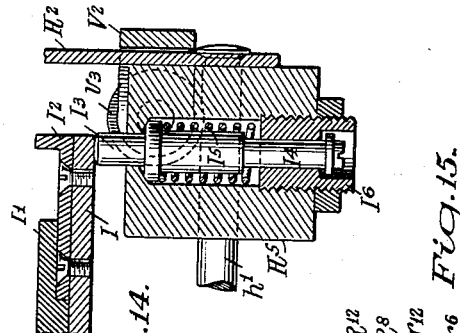
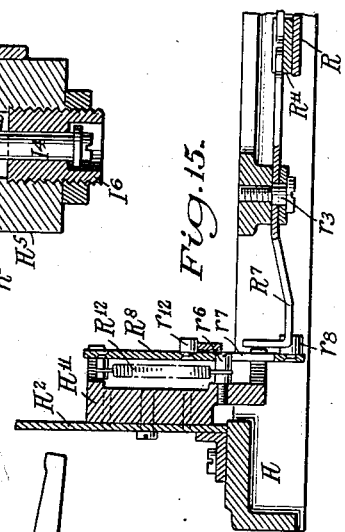
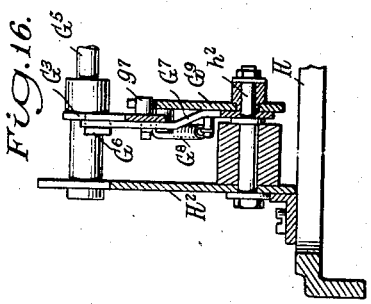
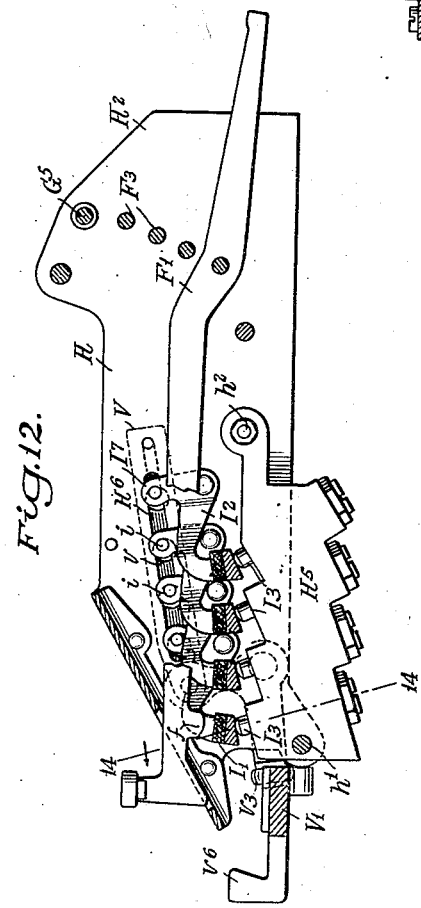
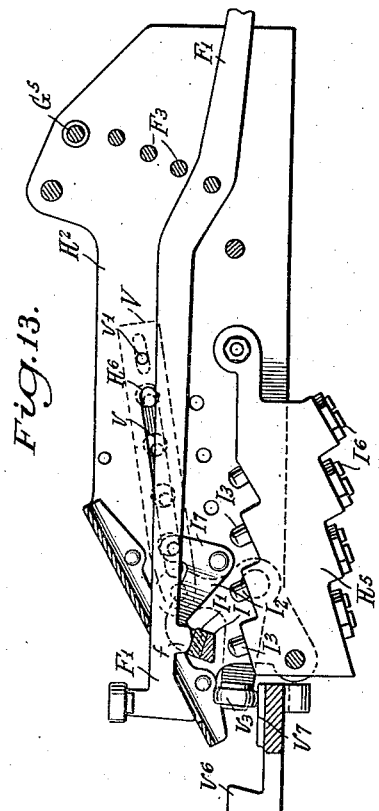
INVENTOR
BY Harold A. Burt
ATTORNEYS

Fig. 17.

| | 1 2 3 4 5 6 7 8 9 0 - @ | qwerty uiop; | asdfghjkl!/u | zxcvbnm,. | En En |
|---|---|---|---|---|---|
| 1 Lower Case Intermediate | | | Dash | | |
| Chan. No. | 49 50 51 52 53 54 55 56 57 58 43 89 | 23 16 1 9 2 17 12 5 4 18 36 90 | 3 7 10 15 21 8 24 22 11 42 44 | 26 25 13 19 20 6 14 33 34 32 38 | |
| 2 Shift Large Cap. Backward | #fl ffi ff # ff ffl ( ) * | QWERTY UIOP: | ASDFGHJKL "/vl | ZXCVBNM?.. | En En |
| Chan. No. | 27 28 29 59 30 31 87 40 39 45 48 | 83 76 61 69 62 77 72 65 64 78 35 88 | 63 67 70 75 81 68 84 82 71 47 44 | 86 85 73 79 80 66 74 37 41 60 46 | |
| 3 Shift Small Cap. Forward | ) ffl 5 8 9 fi z = ! * # | Q W E R T Y U I O P | ( : 4 6 7 ff fl o , . L | 3 1 2 & ffi C V B N M ? . | En En |
| Chan. No. | 45 30 53 56 57 28 26 40 48 59 | 51 49 50 87 31 33 34 32 38 | 39 35 52 54 55 29 58 33 46 | | 44 |

Characters on Same Matrix

INVENTOR
Harold A. Burt
BY
Morrison Kennedy Campbell ATTORNEYS

Patented Aug. 17, 1937

2,090,028

UNITED STATES PATENT OFFICE 2,090,028

TYPOGRAPHICAL MACHINE

Harold A. Burt, St. Albans, N. Y., assignor to Mergenthaler Linotype Company, a corporation of New York Application August 29, 1935, Serial No. 38,397

36 Claims. (Cl. 199—18)

This invention relates to typographical machines, such as Linotype machines of the general organization represented in U. S. Letters Patent to O. Mergenthaler, No. 436,532, wherein by the manipulation of a keyboard, circulating matrices are released from a channeled magazine in the order in which their characters are to appear in print and then assembled in line, the composed line transferred to the face of a mold, the mold filled with molten metal to form a slug or linotype against the matrices which produce the type characters thereon, and the matrices thereafter returned through a distributing mechanism to the magazine from which they started.

In these machines, the keyboard ordinarily employed comprises as many finger-keys as there are channels in a magazine, each key being connected to and located substantially in the vertical plane of the particular magazine channel containing the matrices of the corresponding character, and the order or arrangement of the finger-keys being the same as that of the matrix columns in the magazine. The finger-keys are divided into groups with the "lower-case" at the left, the "upper-case" or "large-caps" at the right, and the "small-caps", numerals, punctuation marks, and other miscellaneous characters in the center. While there are but ninety finger-keys, a selection of one hundred and fourteen different characters is presented, since the keys of the center group usually bear two unlike characters. The matrices controlled by the keys of this center group correspondingly bear two unlike characters disposed thereon one above the other, and in practice these matrices are assembled at an upper or lower level so that either the lower or upper characters may be brought into the casting position as required.

While such a keyboard has been used for many years in Linotype machines, it has often been proposed to substitute therefor one having the standard or universal layout employed in typewriter and similar machines. However, due to the radical difference between Linotype and typewriter keyboards, which lies not only in size and in the number of finger-keys, but also in their arrangement according to character, many serious difficulties must be overcome before such a substitution becomes practical. One of the major problems presented is that of devising a suitable mechanism by means of which the single set of alphabet keys of a typewriter keyboard may control the three different groups of magazine channels containing respectively the lower-case, small-cap, and upper-case characters, and at the same time provide for the release of the small-cap matrices by the non-alphabet keys in selecting numerals, punctuation marks, etc.

While different electrical schemes have been suggested, these are not entirely satisfactory for various reasons, and it is the aim of the present invention to provide an arrangement which is entirely mechanical and which, moreover, may be readily substituted for the regular Linotype keyboard mechanism, without otherwise altering the construction of the standard commercial machine.

To give some idea at the outset of the general scheme followed and according to which the improved mechanism is intended to function, the matrix font, as well as the connections between the keyboard and magazine (which include as usual the escapements, reeds, power-operated cam yokes, and the keyboard slides for controlling the operation of the yokes) should be considered as divided into two sets, one embracing the numerals, lower-case characters and punctuation marks, and the other the large-cap characters, ligatures and other miscellaneous characters. The keyboard with its forty-six finger-keys is normally connected in whole to the first set of keyboard slides. Two shift keys are employed, and when one of these keys is depressed, operative connections are established between all the finger-keys (except one) of the keyboard and the second set of keyboard slides, whereas when the other shift key is depressed, similar connections are established between twenty-four alphabet finger-keys and five non-alphabet finger-keys and as many (29) selected slides of both sets, these particular slides controlling the release of those matrices bearing the small-cap characters, the comma, period and the thin, em and en spaces. In the present instance, therefore, certain keys of the keyboard will each control three different channels of a magazine, and certain channels of the magazine will each be controlled from two different finger-keys.

The mechanism involved and the precise manner in which the parts thereof cooperate to bring about the desired results will best be understood from the detailed description to follow.

Referring to the drawings:—

Fig. 3 is a top plan view partly in section and partly broken away of the parts shown in Fig. 2;

Fig. 4 is a perspective view, showing the connections between an alphabet finger-key and the three slides it controls;

Fig. 5 is a detail view, showing the relation of certain parts of Fig. 4 when the shift frame occupies its forward position;

Fig. 6 is a detail view, similar to Fig. 5, and showing the relation of the parts when the shift frame occupies its rearwardly adjusted position;

Fig. 6a is a detail edge view, showing diagrammatically two small-cap matrices in the upper and lower casting position;

Fig. 7 is a top plan skeleton view, showing the third bank of finger-keys and their individual connections to the controlling slides;

Fig. 8 is a perspective view, showing the connecting devices between the shift keys and the yoke or frame controlled thereby;

Fig. 9 is a perspective view, showing the locking devices for one of the shift keys;

Fig. 10 is a side elevation of the parts shown in Fig. 9, showing the position of the parts when the shift key is locked down;

Fig. 11 is a perspective view of the keyboard locking devices;

Fig. 12 is a fragmentary section through the keyboard, showing the keyboard locking devices in inactive position;

Fig. 13 is a view similar to Fig. 12, but showing the locking devices in active position.

Fig. 14 is an enlarged vertical section taken on the line 14—14 of Fig. 12;

Fig. 15 is a vertical section taken on the line 15—15 of Fig. 2;

Fig. 16 is a detail vertical section taken on the line 16—16 of Fig. 3; and

Fig. 17 is a chart, showing the three matrix groups controlled by the keyboard under three different adjustments. The numbers of the individual magazine channels are also indicated below the characters.

Figure 1:
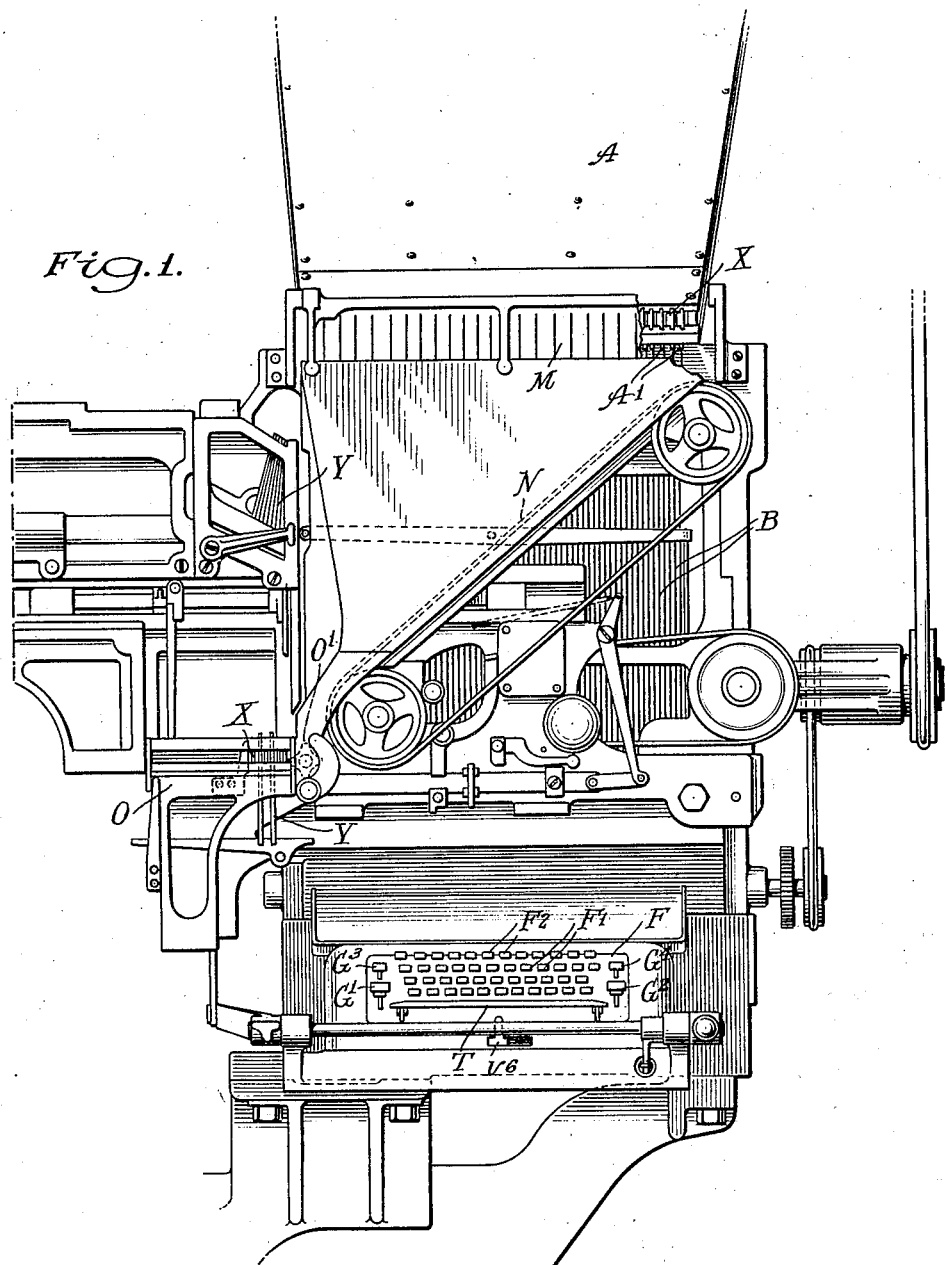
Fig. 1 is a front view of a portion of a Linotype machine equipped with the improved keyboard.

As shown in Fig. 1, the matrices X are stored in the usual order according to character in the channeled magazine A and are released therefrom under control of escapements $A^1$ by a series of vertical reeds B which actuate the escapements. At their lower ends, the reeds B (Fig. 2) terminate above a corresponding series of short reed sections $B^1$, which latter are operated by a set of pivoted yokes C arranged in two banks and provided with cams or eccentrics $C^1$ cooperating with a pair of underlying power-driven rolls D. Trip dogs $D^1$ control the operation of the yokes and a common series of vertical key-controlled slides E actuate the trip dogs. The arrangement and operation of the foregoing parts are well known, and it will suffice to say here that, when a yoke C is tripped by a slide E, the free end thereof will be caused to rise and through the short reed section $B^1$ lift the associated reed B, which latter in turn will actuate the escapement of the corresponding magazine channel and thus release one of the matrices X.

The released matrices (Fig. 1), in leaving the magazine, pass downwardly through a channeled raceway or throat M and onto an inclined belt N which delivers them to an assembler O, wherein they are composed in line together with spacebands Y under the influence of a star wheel $O^1$.

Matrices below fourteen point are usually provided with two characters, one roman and the other italic, and as the matrices enter the assembler they may be arrested at either of two levels by a simple manual adjustment of the assembler rail (not shown) in order to locate the selected characters in casting position. The small-cap matrices of a font come within this point range and are likewise provided with two characters $x^1$, $x^2$, but the characters are unlike; that is to say, a small-cap will be on the same matrix with a numeral (as shown in Fig. 6a) or with a ligature or some miscellaneous character, provided the latter is of a corresponding size or set width.

The keyboard slides E are controlled through intermediate connections, presently to be described, from the finger-keys of a keyboard proper F which, in the present instance (see Fig. 3), corresponds to the standard typewriter keyboard and hence differs radically, both in number and character-arrangement of the keys, from the regular Linotype keyboard.

The keyboard F, as may be observed in Fig. 3, comprises twenty-six alphabet keys $F^1$ and twenty non-alphabet keys $F^2$, the latter being devoted to the numerals, ligatures, punctuation marks, spacers, or quads, and other miscellaneous characters. On eighteen of the non-alphabet keys $F^2$ two different characters are indicated and on the other two only one each, thus providing for a selection of thirty-eight characters aside from those devoted to the alphabet, it being understood that the alphabet key $F^1$ will be utilized for all three sets of alphabet characters in the magazine, namely, "lower-case", "large-cap" and "small-cap". In this connection, it may be noted that the small-cap characters do not include the letters "X" and "Z", so that when the keyboard is connected to the small-cap group, two of the alphabet keys will not be used. If matrices bearing the letters "X" and "Z" are used, they are run as "pi" and composed in line by hand.

The keyboard also includes a pair of shift keys $G^1$, $G^2$, a pair of lock keys $G^3$, $G^4$, associated with the respective shift keys, and a horizontally disposed spaceband key or bar T. As shown in Fig. 3, the shift key $G^1$ at the left of the keyboard is marked "Large cap" and the other shift key $G^2$ at the right is marked "Small cap". The purpose of these keys and the precise manner in which they function will be pointed out later on.

The framework of the keyboard F (see Figs. 1 and 2) comprises generally a main supporting base frame H, a sheet metal keyboard casing $H^1$, a pair of side bracket plates $H^2$ arranged within the casing $H^1$, and an auxiliary box-like member $H^3$, which latter is located adjacent the rear wall of the casing $H^1$ and is fastened to upright side posts $H^4$ rising from the base frame H. The keyboard framework is shown herein as fixed to the main frame of the machine, (as of course it could be), but in practice it will be pivotally mounted in the machine frame in the manner shown and described in the Rogers Patent No. 1,717,411, dated June 18, 1929. Indeed, the parts have been purposely designed so that the present keyboard notwithstanding its typewriter characteristics, may be substituted for the regular Linotype keyboard by dismounting the latter from its pivot and mounting the present keyboard on the same pivot. In other words, the two keyboards will be readily interchangeable and no other alterations will be required in the machine.

The finger-keys $F^1$, $F^2$, of the keyboard F are arranged in four rows or tiers and are pivoted between their ends on fixed horizontal cross rods $F^3$ mounted in the bracket plates $H^2$. Near their front ends, the finger-keys (see Figs. 2 and 12) are formed with depending projections $f$; and directly below the projections of each row or tier of keys, there is arranged a banking bar I, provided with a sound-proof cover strip I¹. The bars I are hingedly connected by means of angular end pieces I² to the bracket plates H² and are supported on spring plungers I³ so as to present a predetermined amount of resistance to the finger-keys when the latter are actuated. The plungers I³ are located at the opposite ends of the banking bars I, being mounted in fixed blocks H⁵ which are secured by means of a tie rod h¹ and bolts h² to the bracket plates H². As shown in Fig. 14, the plungers I³ comprise a shank portion I⁴, a spring I⁵ surrounding the shank portion, and an adjustable screw plug I⁶ against which the spring I⁵ reacts. This peculiar arrangement is intended to give the familiar "typewriter touch" to the finger-keys when they are actuated. As is well known, in the regular Linotype keyboard the finger-keys are actuated by a very "light touch" and with a barely perceptible motion, whereas in typewriters, the keys partake of considerable motion and must be struck with a sharp blow by the fingers to cause the type-bars to make the necessary impact against the platen. While the invention in its broader aspects does not require this refinement, it will be extremely useful to typewriter operators who are not accustomed to the light touch of the regular Linotype keyboard.

In order to lock the finger-keys of the keyboard against actuation when the machine is not in use, the end pieces I² of the banking bars I are each formed with a crank arm I⁷ by means of which said bars may be swung upwardly into engagement with the depending projections f of the finger-keys (see Fig. 13). The crank arms I⁷ (Figs. 3 and 12) are provided with studs i which project laterally therefrom through elongated slots H⁶ in the bracket plates H² and engage enlarged apertures v of a pair of fore-and-aft actuating slides V (Fig. 11). As best shown in Figs. 3 and 12, these slides V are loosely connected at their rear ends by a pin and slot v¹ to the outer side faces of the bracket plates H² and are movable back and forth by a horizontally disposed manually operated bar V¹ through a corresponding pair of bell-crank levers V² centrally pivoted below the slides to the plates H². At their upper ends, the bell-crank levers V² are slotted or forked to make connection with the slides V (Fig. 11), and at their lower ends they are formed with right angular portions v² carrying anti-friction rollers v³ for frictionless contact with the bar V¹. The bar V¹ (Fig. 2) is arranged at the front of the keyboard within the casing H¹ and mounted for endwise movement upon the base frame H to which it is connected by screws and slots v⁴. At its opposite ends, the bar V¹ is formed with beveled or cam surfaces v⁵ and between its ends is provided with a handle v⁶ which projects forwardly through the casing H¹ for ready manipulation by the operator. The anti-friction rollers v³ of the bell-crank levers V² track upon the cam surfaces v⁵, so that when the bar V¹ occupies the position shown in Fig. 11 or Fig. 12, they will allow the banking bars I to drop into engagement with the plungers I³ and thus permit depression of the finger-keys F¹ and F². When, however, the bar V¹ is shifted toward the right far enough to cause the rollers v³ to ride off the cam surfaces v⁵ onto high flat portions v⁷ of the bar V¹, the actuating slides V will be forced rearwardly to the position shown in Fig. 13, lifting the banking bars I and causing them to lock the finger-keys F¹, F² against depression.

Figure 2:
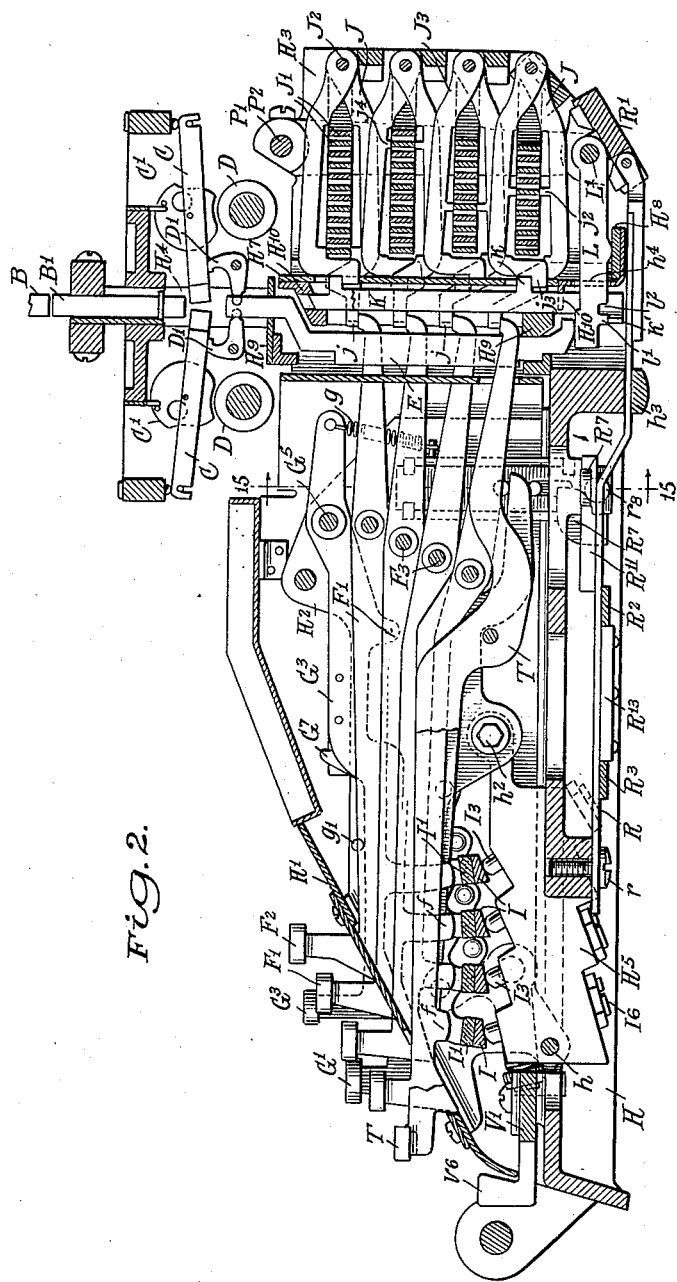
Fig. 2 is a vertical section through the keyboard mechanism.

At their rear ends (see Figs. 2, 3 and 4), the finger-keys F¹, F², of each row, engage beneath bent-over nose portions j formed at the forward ends of a set of actuating levers J through which the keys are operatively connected to a corresponding set of U-shaped rocking bails J¹, there being four sets of bails for the four rows of finger-keys and as many bails in each set as there are keys in the respective rows. As best shown in Fig. 2, the different sets of bails J¹ are arranged one above the other in the auxiliary frame member H³ and are mounted on separate pivot rods J², with the cross members j¹ of the individual bails J¹ resting upon teeth or projections j² formed on the upper edges of the actuating levers J. The teeth j², as will be observed in Fig. 2, are differently located, so that each bail of the four sets may be operated by a separate lever J when the corresponding finger-key F¹ or F² is depressed. To avoid friction between their points of contact with the bails, the levers J are mounted at their rear ends on the same pivot rods J² and are themselves supported at the front in a vertical slotted guide plate H⁷ which forms the front wall of the auxiliary frame member H³. As the bails J¹ are rocked upwardly by the depression of the finger-keys, motion is imparted thereby through overlying levers J³ to a series of vertical actuating rods K and thence to the controlling slides E in a manner about to be described.

The levers J³ for the different bail sets, like the levers J, are mounted at their rear ends on the pivot rods J² and at the front present shoulders j³ which engage beneath corresponding lugs k projecting from the rear edges of the actuating rods K. On their lower edges, the levers J³ are formed with teeth or projections j⁴ which, like the teeth j² of the levers J, are differently located to engage the cross members j¹ of different bails J¹. The arrangement is such that, as a bail is rocked upwardly by a finger-key, it will raise those overlying levers J³ whose teeth engage it, and they in turn will lift the corresponding actuating rods K.

At their lower ends, the rods K are formed with ears or lugs k¹, and are adapted to actuate the controlling slides E through the medium of a series of fore-and-aft selecting bars L, the latter being arranged with their front ends beneath the slides E and formed in their lower edges with combination notches and tooth portions l¹, l², which are located above the lugs k¹ of the rods K.

The selecting bars L are connected by means of a pivot rod L¹ to a yoke member or shift frame P, which is suspended by its side arms P¹ from an overhead pivot rod P², so that it may be moved backwardly and forwardly to locate the bars L in different adjusted positions relatively to the actuating rods K. During the adjusting movements of the yoke P, the selecting bars L (see Fig. 2) are sustained in operative relation to the lugs k¹ of the bars K and also in engaging relation to the lower ends of the controlling slides E by a horizontal plate H⁸ which is arranged beneath the bars and secured to side walls of the auxiliary frame member H³.

The controlling slides E are properly guided in their vertical movements by upper and lower comb plates or bar sections H⁹, which constitute part of the keyboard framework, and the rods K are similarly guided by upper and lower comb plates H¹⁰. The lower comb plate for the actuating rods K (Fig. 2) serves also as a guiding member for the selecting bars L, being formed with a slotted vertical section $h^4$ through which the said bars extend. The notches and tooth portions $l^1$, $l^2$ of the selecting bars L of course vary in form and, through their cooperation with the lugs $k^1$ of the rods K, are adapted to make and break operative connections between different groups of the controlling slides E and the finger-keys as the bars L are shifted to their different adjusted positions. It is in this way that the keyboard, with its forty-six keys, may through the bails $J^1$ control the release of the matrices stored in the ninety channels of the magazine A.

The shift frame P is adjustable to three different positions, and the parts are so arranged that under the different conditions of adjustment the keyboard will be connected alternatively to those magazine channels containing the matrices indicated in the three horizontal divisions of the chart shown in Fig. 17. That is to say, in intermediate or "lower-case" position of the shift frame, the keyboard will control all the characters (46 in all) appearing in the first division of the chart, the keys $F^1$ being at the time connected to the slides E for the magazine channels which contain the alphabet matrices, and the keys $F^2$ being connected to other slides E for the magazine channels which contain the non-alphabet matrices; whereas, in the backward or "upper-case" position of the shift frame, the keyboard will control all the characters (45 in all) appearing in the second division of the chart, the keys $F^1$ being at the time connected to the slides E for the magazine channels which contain the alphabet matrices, and the keys $F^2$ being connected to other slides E for the magazine channels which contain the non-alphabet matrices. Under these two adjustments, the keyboard will be connected to two entirely different sets of magazine channels as will be evident by a comparison of the channel numbers appearing in the chart below the corresponding characters, and moreover all the finger-keys of the keyboard will be operative except for one key, namely, the "@" key, under the "upper-case" adjustment. In operating the keyboard under said two adjustments, the selection of the characters will be governed by the index characters borne by the finger-keys, it being understood that the lower index characters of the double-index-character keys will be used for the lower-case group of matrices and the upper index characters of said keys used for the upper-case group of matrices, the only exception being in the case of the "@" finger-key which is used only for the lower-case group. It will also be understood that the matrices in both the lower-case and upper-case groups may be provided with duplicate alphabet characters, one roman and the other italic, as usual, and that in the selection of the italic characters the assembler duplex rail will need to be operated as heretofore.

In the forward or "small-cap" position of the shift frame, the keyboard will control all the characters (29 in all) appearing in the lower line of the third division of the chart (it being remembered that the letters "X" and "Z" are omitted from this "small-cap" group), the keys $F^1$ being at the time connected to the slides E for the magazine channels containing the alphabet matrices, and the keys $F^2$ being connected to the magazine channels containing the non-alphabet matrices. Under this third adjustment, and as will again be evident by a comparison of the channel numbers appearing in the chart, the particular finger-keys affected (only 29 this time) will be operatively connected in part to slides E in the "lower-case" set and in part to slides E in the "upper-case" set. The remaining keys (17 in number) under this adjustment will of course be idle or out of use, and hence when it is desired to select any of the characters which they represent, the shift frame P will have to be adjusted to its "lower-case" or "upper-case" position as required. The operator will understand that, for this third adjustment of the shift frame, the twenty-nine (29) affected keys will be constituted by all of the alphabet keys except the X and Z keys and by four (4) of the non-alphabet keys, namely, those for the em, en, and thin spaces and for the period and comma, respectively, so that the index characters borne by these particular twenty-nine (29) finger-keys will be used in the selection of the characters of the small-cap group of matrices.

Most of the characters represented by the non-alphabet keys $F^2$, as may be observed by referring to the upper line of the third horizontal division of the chart, are carried on the "small-cap" matrices, and in order that the alphabet keys $F^1$ may also control the magazine channels containing these "small-cap" matrices, there are provided additional means which become effective when the shift frame P is moved to its forward position and which establish the required connections between the keys $F^1$ and the appropriate or corresponding slides E. Such means, as best shown in Fig. 4, consists merely of an extra or auxiliary actuating rod $K^1$ (Fig. 4) for each of those slides E which control the magazine channels containing the alphabet matrices of this "small-cap" division (24 in all). The rods $K^1$, like the rods K, are formed at their rear edges with shoulders $k^3$ so that they may be operated by extra levers $J^3$ in the same manner as the rods K, and they (the rods $K^1$) are also formed at their lower ends with lateral lugs $k^4$ to cooperate with the distinguishing notches and tooth portions $l^1$, $l^2$ of the associated selecting bars L. As to the five non-alphabet characters in this third division, no auxiliary rods $K^1$ are necessary, the selecting bars L being formed to connect the finger-keys to the appropriate slides E through the rods K under the different adjustments.

It will be noted that the two unlike characters of all the "small-cap" matrices, as indicated in the third horizontal division of the chart, appear on separate finger-keys $F^1$, $F^2$. For example, take the two characters "4" and "D" in the fifteenth column of this third division: These characters are punched in the same matrix, which, according to the chart, occupies magazine channel No. 52. In the forward or "small-cap" position of the shift frame P, the alphabet key $F^1$ bearing the letter "D" (see Fig. 4) will be connected to this channel through an actuating rod $K^1$ and the associated slide E, but in the intermediate or "lower-case" position of the frame P, this connection will be broken and the non-alphabet key $F^2$ bearing the numeral "4" will be connected to magazine channel No. 52 through an actuating rod K and the same slide E. This condition holds true as to all "small-cap" matrices having companion characters appearing either in the first or "lower-case" horizontal division of the chart or in the second or "large-cap" horizontal division. In this connection, it may be explained that the alphabet letters of the "small-cap" matrices appear in the lower or auxiliary position on the matrix bodies, and hence whenever the shift frame P is adjusted to its "small-cap" position, it will be necessary for the operator to adjust the assembler duplex rail as heretofore so as to compose these matrices in the upper or auxiliary position in the assembler.

It will now be clearly understood that each of the alphabet keys $F^1$ of the keyboard controls at different times three different magazine channels, one containing "lower-case" matrices, the second "large-cap" matrices, and the third "small-cap" matrices, and for a further illustration of the manner in which this is accomplished by the mechanism above described, reference may be had to Figs. 4, 5, 6 and 7. In Fig. 4, the shift frame P is shown in its intermediate or "lower-case" position, and the connecting elements between one of the alphabet keys $F^1$ and the three different controlling slides E is indicated. In the example given, the single bail $J^1$ is adapted, when the alphabet finger-key $F^1$ is depressed, to lift the three overlying levers $J^3$ and also the two actuating rods K and the auxiliary actuating rod $K^1$ to which said levers are connected. Here the form of the distinguishing notches $l^1$ and tooth portions $l^2$ of the three corresponding selecting bars L is such that a tooth portion $l^2$ of the selecting bar L at the extreme left (Fig. 4) is in register with the lug $k^1$ of the associated actuating rod K, while notches $l^1$ of the other two selecting bars are in register with the lugs $k^1$, $k^4$ of the actuating rods K, $K^1$, with which they are respectively associated. Consequently, as the three actuating rods are lifted simultaneously by the levers $J^3$, the two selecting bars L at the right will be undisturbed, whereas the remaining bar L at the left, because of the engagement of its tooth portion $l^2$ with the lug $k^1$ of the associated rod K, will be raised and thus actuate the "lower-case" slide E. As a result, the cam yoke C to which this actuated slide is connected will be tripped and, through the overlying reed B, cause the release of a matrix bearing the "lower-case" character corresponding to that of the finger-key $F^1$. While the alphabet finger-key $F^1$ does not at this time operate the "small-cap" slide E, the latter, as may be observed, is operable through its (other) rod K and lever $J^3$ by a non-alphabet finger-key $F^2$ which carries the companion character of the corresponding "small-cap" matrix, in this case the numeral "4".

When now the shift frame P is moved to its rearward position as indicated in Fig. 6, an operative connection is established in like manner between the alphabet finger-key $F^1$ and the "large-cap" slide E at the extreme right, to the exclusion of the other two slides E, so that a matrix bearing an "upper-case" character corresponding to that of the finger-key $F^1$ will be released from the magazine A when the key is depressed. This is because, under this adjustment of the frame P, the lugs of the actuating rods K and $K^1$ for the "lower-case" and "small-cap" slides E, respectively, will register with the notches $l^1$ in the associated selecting bars L, whereas the lug $k^1$ of the actuating rod K for the "large-cap" slide will (as shown in Fig. 6) register with a tooth portion $l^2$ of its associated selecting bar L. It may be stated generally that all finger-keys bearing two characters will be connected without exception with the magazine channels corresponding to the lower characters (appearing in the first division of the chart shown in Fig. 17) when the shift frame P is adjusted to its intermediate or "lower-case" position and to the upper characters (appearing in the second division of the chart) when said frame is adjusted to its rearward or "upper-case" position. Consequently (referring again to Fig. 4), under the rearward adjustment of the frame P, the connection between the "small-cap" slide E and both of its actuating rods K, $K^1$, are broken, but here again it may be noted that the non-alphabet finger-key $F^2$ bearing the numeral "4" may be connected through its associated lever $J^3$ and another actuating rod K (not shown) to the slide E controlling the "$" character, since this character also appears (in the upper position) on the same finger-key, see Fig. 3.

When, as a final adjustment, the shift frame P is swung to its forward or "small-cap" position as indicated in Fig. 5, the "lower-case" and "large-cap" slides E are idle and the finger-key $F^1$ will now be connected through the actuating rod $K^1$ to the "small-cap" slide E, which controls the matrix channel of corresponding character. Under this condition of adjustment, the lug $k^4$ of the actuating rod $K^1$ will engage with a tooth portion $l^2$ of the associated (middle) selecting bar L, while the lug $k^1$ of the companion rod K will register with a notch $l^1$ of said selecting bar, and hence the alphabet finger-key $F^1$ bearing the letter "D" (rather than the non-alphabet finger-key $F^2$ bearing the numeral "4") will be connected to the "small-cap" slide E. It will have been understood that the other two rods K for the "lower-case" and "large-cap" slides E are also rendered ineffective due to the registry of their lugs $k^1$ with the notches $l^1$ of the associated levers L.

Reference at this point to Fig. 7 may be helpful. Here the arrangement of the bails $J^1$ of the third set is shown in plan together with the finger-keys which operate them and the connections therefrom to the corresponding controlling slides E. The particular bails $J^1$ actuated by the different finger-keys are designated by small circles placed over the underlying levers J, and the particular overlying levers $J^3$ controlled by the individual bails are also designated by circles placed over said levers, so that the connections may be easily traced from any selected finger-key to the connected bail $J^1$ and thence along the same to the different overlying levers $J^3$, these latter being shown connected to the corresponding actuating rods K or $K^1$, selecting bars L, and controlling slides E. It is pointed out that while each of the alphabet keys $F^1$ controls through its respective bail $J^1$ three different controlling slides E, the non-alphabet key $F^2$ for the "thin space" controls but one slide under all three adjustments of the shift frame P. This is the only instance of its kind (see the chart in Fig. 17) and is provided for by making the associated selecting bar L plain or solid (i. e. without the distinguishing notches $l^1$ or teeth $l^2$), so that the finger-key will maintain its connection with the single slide E and corresponding magazine channel irrespective of the adjusted position of the shift frame P. The other non-alphabet key $F^2$ shown in Fig. 7 (see again the chart of Fig. 17) controls two different slides E, one (No. 42) in the "lower-case" position of the shift frame and the other (No. 47) in the "large-cap" position of said frame. So it is with all the other non-alphabet keys of the keyboard except the one before mentioned, namely, the "@" key, which controls one slide E only (No. 89) in the "lower-case" position only of the shift frame. To make the discussion complete, attention may be directed to the non-alphabet finger-keys for the comma, period, and em and en spaces appearing in both the "lower-case" and "small-cap" divisions (at the very end) of the chart in Fig. 17. While these particular double index character finger-keys each control two different slides E in the "lower-case" and "large-cap" positions of the shift frame, they also control the "lower-case" slides E (Nos. 33, 34, 32 and 38) in the "small-cap" position of the shift frame. This of course is made possible by forming the selecting bars L associated with these particular slides E so that the rods K will be raised in either position of the shift frame. The same expedient could be employed for other of the non-alphabet keys if that were found to be desirable.

Reference is now directed to Figs. 8, 9 and 10, which illustrate the devices through which the shift keys $G^1$, $G^2$, and their associated lock keys $G^3$, $G^4$, control the adjustments of the shift frame P. These devices (see also Fig. 2) include a fore-and-aft slide bar R arranged beneath the base frame H and connected thereto for endwise movement by a screw and slot $r$ at the front and by a sustaining guide bracket $h^3$ at the rear. The bar The levers $R^2$, $R^3$, are pivoted respectively at $r^1$, rear end to the shift frame P by means of a coupling $R^1$ and is held resiliently in the position shown in Figs. 2 and 8 against movement in either direction by a pair of spring-actuated levers $R^2$, $R^3$, which are disposed transversely of and beneath the bar R in engaging relation to a plate $R^{13}$ secured to the lower face of said bar. The levers $R^2$, $R^3$, are pivoted respectively at $r^1$, $r^2$, to the base frame H and are held apart in parallel spaced relation, in opposition to a connecting spring $R^4$, by a fixed stop plate $R^5$ against which their free ends engage.

The rearward movement of the bar R is effected by a horizontally disposed lever $R^7$ from the "large-cap" shift key $G^1$ through a vertical slide plate $R^8$, and the forward movement of the bar is effected by a similar lever $R^9$ from the "small-cap" shift key $G^2$ through a corresponding slide plate $R^{10}$. The levers $R^7$, $R^9$ (see Fig. 3) are intermediately pivoted to the base frame H on vertical axes $r^3$, $r^4$, and are arranged end to end with their nose portions seated in a recess $r^5$ of a block $R^{11}$ secured to the top of the bar R.

As best shown in Fig. 15, the slide plates $R^8$, $R^{10}$, are mounted in fixed bracket members $H^{11}$ of the framework and are held resiliently against upward movement by pull springs $R^{12}$ connected to the upper ends of the plates and anchored to pins $r^6$ projecting laterally from the members $H^{11}$. The pins $r^6$ engage in corresponding slots $r^7$ formed in the slide plates $R^8$, $R^{10}$, and sustain the plates vertically in normal downward position against the tension of the springs $R^{12}$. At their lower end, the plates $R^8$, $R^{10}$ are provided with anti-friction rollers $r^8$, $r^9$, which are arranged to engage respectively curved or cam surfaces $r^{10}$, $r^{11}$ formed on the contiguous end portions of the aforementioned horizontal levers $R^7$, $R^9$.

The shift keys $G^1$ and $G^2$ are pivotally mounted on the bolts $h^2$, before mentioned (see Figs. 2 and 16), and are connected at their rear ends to the vertical slide plates $R^8$ and $R^{10}$, respectively, by means of studs $r^{12}$, which project laterally from the inner side faces of the said plates over the said keys. Consequently, when the "large-cap" shift key $G^1$ at the left (Figs. 3 and 8) is actuated, the connected slide plate $R^8$ will be raised and the roller $r^8$ thereon will rock the lever $R^7$ so as to move the bar R rearwardly against the tension of the pull spring $R^4$ and thus swing the shift frame P in the same direction to its backward adjusted position shown in Fig. 6. As the shift key $G^1$ is released, the parts will be restored to their original positions, the slide $R^8$ by its control spring $R^{12}$, and the bar R and shift frame P by the spring $R^4$ through the lever $R^2$.

On the other hand, when the "small-cap" shift key $G^2$ at the right (Fig. 8) is actuated, the corresponding slide plate $R^{10}$ will be raised and the roller $r^9$ thereon will rock the lever $R^9$ so as to move the bar R forwardly against the tension of the spring $R^4$, and thus swing the shift frame P to its forward adjusted position shown in Fig. 5. As the shift key is released, the parts will be restored to their normal position, the slide $R^{10}$ by spring $R^{12}$, and the shift frame P and bar R by the spring $R^4$ through the lever $R^3$.

The lock keys $G^3$, $G^4$, for the two shift keys $G^1$, $G^2$, are substantially alike in form and the parts through which they control the shift keys also correspond, so that a description of one will suffice for both. As shown in Figs. 3, 9 and 10, a vertical pawl $G^7$, pivoted on the bolt $h^2$ and and provided at its rear end with a spring $g$, which tends to raise the front portion of the key and hold it constantly engaged with a fixed stop pin $g^1$ (see Fig. 2). About midway of its length, the lock key $G^4$ is provided with an integral latch piece $G^6$, and near its front end with a stud $g^2$, the latter projecting laterally above a cam surface $g^3$ on the upper edge of the shift key $G^2$. The latch piece $G^6$ is arranged to cooperate with a vertical pawl $G^7$, pivoted on the bolt $h^2$ and provided with a spring $G^8$ which holds it resiliently against the front end of the latch piece. The spring $G^8$ is anchored to a depending projection $g^4$ of the lock key $G^2$, and the pawl $G^7$ is formed with a notch $g^5$ located directly below the latch piece $G^6$, so that as the lock key $G^4$ is depressed and the latch piece brought into registry with the notch $g^5$ the latch pawl will be rocked by the spring $G^8$ into engagement with the same and thus lock both the keys $G^2$ and $G^4$ in their active position shown in Fig. 10, the shift key $G^2$ being caused to move with the lock key $G^4$ through the connecting stud $g^2$.

As a result of this operation, the shift frame P may be moved and sustained against the tension of its return spring $R^4$ in its forward adjusted position for any length of time desired; and by a similar operation of the corresponding lock key $G^3$ and shift key $G^1$, the shift frame may be moved and sustained in its rearward adjusted position. To disengage the pawl $G^7$ from the latch piece $G^6$ and thus release the key $G^2$, the shift key (as shown best in Fig. 10) is provided with a stud $g^6$ projecting laterally from an upright finger $G^9$ and which is located adjacent the rear edge of the pawl $G^7$. The finger $G^9$ rises from the upper edge of the key $G^2$ and is arranged to engage a stop pin $g^7$ riveted to the lock key $G^4$ at a point immediately in front of the finger $G^9$. With the parts in the position shown in Fig. 10, it will be observed that there is sufficient space allowed between the finger $G^9$ and stop pin $g^7$ to permit an independent downward movement of the shift key $G^2$. By such movement, the stud $g^6$ is caused to engage and swing the pawl $G^7$ out of engagement with the tooth member $G^6$ and thus allow both the shift key $G^2$ and its lock key $G^4$ to rise to their normal position under the influence of their return springs $R^{12}$ and $g$, respectively In this connection, it may be mentioned that the stop pins $g^7$, through their engagement with the fingers G⁹, are adapted to limit the active stroke of the shift keys G¹, G², when the latter are actuated directly, but when they are actuated through the lock keys G³, G⁴, their active stroke will be limited by the engagement of the tooth member G⁶ with the lower wall of the recess or notch g⁵, which is disposed in the path of the said member (see Fig. 10).

It may be mentioned in conclusion that the spacebands Y, before alluded to, are stored as usual in a separate magazine Y¹ (Fig. 1) and their release for assemblage in line with the matrices X is controlled from the key or bar T, the latter (see Fig. 3) being arranged on the keyboard G in a position corresponding to that of the ordinary space-key of a typewriter. This spaceband key, like the other finger-keys F¹, F², is pivoted between its ends on a fixed cross rod T¹ (Fig. 2) and is permanently connected through an individual bail J¹ and actuating rod K to an extra slide E arranged at the extreme right-hand side of the keyboard F. This particular slide controls the operation of an overhead cam yoke (not shown) and the latter is connected, as usual, by means of a short vertical reed B¹ and a horizontal rocking bar B² to the escapement of the spaceband magazine Y¹ (see Fig. 1). As will be understood, spacebands may be released in any of the three adjusted positions of the shift frame.

In the accompanying drawings, the invention has been shown merely in preferred form and by way of example and obviously many changes and alterations may be made therein and in its mode of operation without departing from its spirit. Thus, the adjustable connections by which the finger-keys are connected to the different matrix groups could, if desired, be located above instead of below the power-operated cam yokes, in which case of course the slides E would operate the escapement reeds directly rather than through the cam yokes. However, the specific arrangement shown and described is preferred because it lends itself more readily to application to existing machines. It should be understood, therefore, that the invention is not limited to any specific form or embodiment except insofar as specified in the appended claims.

Having thus described my invention, what I claim is:

1. In a typographical machine, the combination of a channeled magazine containing a font of matrices divided into lower-case, large-cap, and small-cap groups, respectively, a main keyboard comprising alphabet finger-keys each bearing a single index character as well as non-alphabet finger-keys each bearing two unlike index characters, and intermediate mechanical devices adjustable to connect certain alphabet finger-keys to any desired one of the three matrix groups to the exclusion of the others and certain non-alphabet finger-keys to either one of two of said matrix groups to the exclusion of the others.

2. In a typographical machine, the combination of a channeled magazine containing a font of matrices divided into lower-case, large-cap, and small-cap groups, respectively, a main keyboard comprising alphabet finger-keys each bearing a single index character as well as non-alphabet finger-keys each bearing two unlike index characters, and intermediate mechanical devices adjustable to connect certain alphabet finger-keys to any desired one of the three matrix groups to the exclusion of the others and certain non-alphabet finger-keys to either the lower-case or large-cap matrix group to the exclusion of the others.

3. A combination according to claim 1, wherein the keyboard comprises additional non-alphabet finger-keys which are connected by the adjustment of the intermediate mechanical devices alternatively to the three matrix groups, and wherein the matrices represented by one of the index characters of said keys are duplicated in two of the matrix groups.

4. A combination according to claim 1, wherein certain matrices are included in different groups, each of said certain matrices bearing two unlike characters, and wherein said matrices are connected to different finger keys under different adjustments of said intermediate mechanical devices.

5. A combination according to claim 1, wherein the matrices comprising the small-cap group are included partly in the lower-case group and partly in the large-cap group, and wherein said matrices are connected to different fingers under different adjustments of said intermediate mechanical devices.

6. A combination according to claim 1, wherein the alphabet character matrices comprising the small-cap group are included partly in the lower-case group and partly in the large-cap group, each of said matrices bearing a non-alphabet character appearing in either the lower-case group or the large-cap group, and wherein said matrices are connected to alphabet finger-keys under one adjustment of said intermediate mechanical devices and to non-alphabet finger-keys under other adjustments of said devices.

7. A combination according to claim 1, wherein the matrix font includes a thin space element and wherein the keyboard includes a non-alphabet finger-key for such element, which key remains permanently connected to the corresponding magazine channel under all conditions of adjustment of said intermediate mechanical devices.

8. A combination according to claim 1, wherein the matrix font includes em and en quads, and wherein the keyboard includes non-alphabet finger-keys for such quads, which keys control the corresponding magazine channels either when the keyboard is connected to the lower-case matrix group or to the small-cap matrix group.

9. A combination according to claim 1, wherein the intermediate mechanical devices normally occupy one position of adjustment for the connection of the appropriate finger-keys to the lower-case matrix group, and wherein the keyboard includes two shift keys, one operable to adjust the said devices to a second position for the connection of the appropriate finger-keys to the large-cap matrix group, and the other operable to adjust said devices to a third position for the connection of the appropriate finger-keys to the small-cap matrix group.

10. In a typographical machine, the combination of a magazine having escapements and containing a font of matrices arranged therein in a given order as to character, a keyboard having its finger-keys arranged in different order as to character, a series of power-operated reeds divided into two sets for actuating the escapements, and intermediate mechanical devices adjustable to connect the appropriate finger-keys of the keyboard to either set of reeds or in part to selected reeds of both sets, as desired.

11. In a typographical machine, the combination of a magazine having escapements and containing a font of matrices, a keyboard having finger-keys arranged according to the standard typewriter layout, a series of power-operated reeds divided into two sets for actuating the escapements, and intermediate mechanical devices adjustable to connect the appropriate finger-keys of the keyboard to either set of reeds or in part to selected reeds in both sets, as desired.

12. A combination according to claim 10, characterized by the fact that said mechanical devices include elements operable under one adjustment to connect selected reeds to certain finger-keys and under another adjustment to connect the same reeds to different finger-keys.

13. In a keyboard mechanism for typographical machines, the combination of three power-operated cam yokes, three controlling slides therefor, a single movable finger-key, and mechanical devices whereby the finger-key may be operatively connected with any selected slide to the exclusion of the others, said devices acting to transmit the motion of the finger-key to the selected slide in operating the latter.

14. In a keyboard mechanism for typographical machines, the combination of a power-operated cam yoke, a controlling slide therefor, two finger-keys, and mechanical devices adjustable to operatively connect the said slide to either of the finger-keys to the exclusion of the other, as desired.

15. In a keyboard mechanism for typographical machines, the combination of a finger-key, two power-operated cam yokes, two controlling slides therefor, two actuating rods, one for each of the slides, two intermediate selecting bars arranged to cooperate with the actuating rods, and means for adjusting the selecting bars to different positions so as to connect the finger-key with either one of the controlling slides to the exclusion of the other.

16. In a keyboard mechanism for typographical machines, the combination of two cam yokes, two controlling slides therefor, an actuating rod for each of said slides, a single finger-key, means controlled by the key for operating both rods simultaneously, and adjustable means for connecting either of said rods to the associated controlling slide to the exclusion of the other.

17. In a keyboard mechanism for typographical machines, the combination of a cam yoke, a controlling slide therefor, a key-controlled actuating rod, and means adjustable to make and break an operative connection between said rod and slide, as desired.

18. In a keyboard mechanism for typographical machines, the combination of a power-operated cam yoke, a controlling slide therefor, a pair of actuating elements associated with the slide, two finger-keys connected respectively to the said elements, and a common selecting member arranged to cooperate with both actuating elements and adjustable to establish an operative connection between the controlling slide and either finger-key to the exclusion of the other.

19. In a keyboard mechanism for typographical machines, the combination of a series of controlling slides divided into two sets, a series of adjustable selecting bars associated with the respective slides, finger-keys, and manually operated means for adjusting said bars to three different positions to establish a series of operative connections between either set of controlling slides and the appropriate finger-keys or between selected controlling slides in both sets and the appropriate finger-keys.

20. In a keyboard mechanism for typographical machines, the combination of a series of controlling slides divided into two sets, a series of adjustable selecting bars associated with the respective slides, finger-keys, and manually operated means for adjusting said bars to different positions to establish operative connections between the appropriate finger-keys and the different sets of controlling slides.

21. In a keyboard mechanism for typographical machines, the combination of a series of controlling slides divided into two sets, finger-keys, two shift keys, and intermediate devices operable mechanically and controlled by the two shift keys for establishing a series of operative connections between either set of controlling slides and the appropriate finger-keys or between selected controlling slides in both sets and the appropriate finger-keys.

22. In a keyboard mechanism for typographical machines, the combination of a series of controlling slides divided into two sets, finger-keys, and adjustable shift frame, and a series of selecting bars carried by said frame for establishing operative connections between one set of slides or the other and the appropriate finger-keys or between selected slides in both sets and the appropriate finger-keys, according to the adjusted position of the shift frame.

23. A combination as in claim 22, characterized by the fact that the shift frame is adjustable in opposite directions from a normal position to its other two positions, and that the selecting bars establish operative connections between the finger-keys and one set of slides in the normal position of the shift frame.

24. A combination as in claim 22, characterized by the fact that the shift frame is adjustable in opposite directions from a normal position to its other two positions by two shift keys, each equipped with means for locking the shift frame in its adjusted position.

25. A combination according to claim 22, including a spring for holding the shift frame resiliently in a normal position, and means operable by a pair of shift keys for adjusting said frame against the tension of the spring to its other two positions.

26. In a keyboard mechanism for typographical machines, the combination of a plurality of controlling slides, an actuating member associated with each of the slides, a single finger-key, devices for connecting the finger-key to all of said actuating members, and selecting bars adjustable to different positions to establish an operative connection between any one of the slides and its associated actuating member.

27. A combination according to claim 26, characterized by the fact that the said devices include a rocking bail operable by the finger-key and pivoted levers operable by said bail and connected to the respective actuating members.

28. A combination as in claim 26, characterized by the fact that the actuating members are formed with lips or lugs and the selecting bars with cooperating distinguishing notches such that an operative connection will be established between only one of the slides and its actuating member in any adjusted position of the selecting bars.

29. In a keyboard mechanism for typographical machines, the combination of a series of controlling slides divided into two sets, a main actuating rod associated with each of said slides, an auxiliary actuating rod associated with each of certain selected ones of said slides, finger-keys, and adjustable devices for establishing operative connections between the appropriate finger-keys and the controlling slides of one set or the other or between the appropriate finger-keys and certain selected slides of both sets, said adjustable devices in the latter condition of adjustment acting through the auxiliary actuating rods.

30. In a keyboard mechanism for typographical machines, the combination of a series of controlling slides divided into two sets, a main actuating rod associated with each of said slides, an auxiliary actuating rod associated with each of certain selected ones of said slides, finger-keys, a shift frame, and selecting bars carried by said frame and cooperating with the actuating rods for establishing operative connections between one set of controlling slides or the other and the appropriate finger-keys or between selected slides in both sets and the appropriate finger-keys, according to the adjusted position of the shift frame, certain of the selecting bars being common to both the main and auxiliary actuating rods.

31. In a keyboard mechanism for typographical machines, the combination of a plurality of controlling slides, a corresponding plurality of actuating members associated with the respective slides, a corresponding plurality of selecting bars adjustable to establish an operative connection between one or another controlling slide and its associated actuating member as required, a corresponding plurality of operating levers connected to the respective actuating members, a rocking bail common to all of said operating levers, a single operating lever for the rocking bail, and a single finger-key connected to the bail operating lever, whereby the single finger-key selectively controls the operation of the different controlling slides.

32. A combination according to claim 31, characterized by the fact that the rocking bail, its operating lever, and the plurality of operating levers for the actuating members, are all pivoted on the same axis.

33. In a keyboard mechanism for typographical machines, the combination of a series of power-operated elements, a corresponding series of finger-keys, intermediate devices for communicating the actuating movement of the keys to the power-operated elements, and means distinct from said intermediate devices for offering a predetermined resistance to the actuating movement of the finger-keys, whereby the "touch" of the finger-keys may be made heavier than that which is necessary to control the power-operated elements.

34. In a keyboard mechanism for typographical machines, the combination of a series of power-operated elements, a corresponding series of finger-keys controlling the operation thereof, said keys being arranged in tiers, and a yieldable banking bar arranged below the finger-keys of each tier and serving to offer a predetermined resistance to the downward actuating movement of the keys.

35. In a keyboard mechanism for typographical machines, the combination of a series of power-operated elements, a corresponding series of finger-keys controlling the operation thereof, said keys being arranged in tiers, a yieldable banking bar arranged below the finger-keys of each tier and serving to offer a predetermined resistance to the downward actuating movement of the keys, and means common to all of the banking bars for locking them against yielding so as thereby to lock the finger-keys against actuation.

36. In a keyboard mechanism for typographical machines, the combination of a series of power-operated elements, a corresponding series of finger-keys controlling the operation thereof, said keys being arranged in tiers, a bar arranged below the finger-keys of each tier in spaced relation thereto, and means common to all of the bars for raising them into contact with the finger-keys and for locking them in such raised position, thereby locking the finger-keys against actuation.

HAROLD A. BURT.